Patented June 15, 1954

2,681,323

UNITED STATES PATENT OFFICE 2,681,323

POLYSTYRENE PHONOGRAPH RECORD AND PROCESS OF MANUFACTURE

Frazier Groff, Plainfield, Peter B. Potter, Martinsville, and Robert W. Smith, Morristown, N. J., assignors, by mesne assignments, to Union Carbide and Carbon Corporation, a corporation of New York No Drawing. Application March 22, 1949, Serial No. 82,908

11 Claims. (Cl. 260—23)

This invention relates to improvements in polystyrene phonograph records, improved polystyrene compositions and processes for producing such compositions.

It has been proposed heretofore, to manufacture phonograph records from polystyrene resin by molding the resin in presses or stampers having the negative pattern of the sound grooves. On the other hand, it has been reported that polystyrene records have poor resistance to abrasion caused by the playing needle of the record player. The addition to polystyrene of conventional record composition fillers, such as slate flour, clay, barytes, carbon black and the like was found to yield only a slight improvement with respect to wear caused by the playing needle. Such filler modified records when subjected to wear tests in a record player were definitely inferior, however, to commercial shellac records after only 25 playbacks, as regards noise level and sound fidelity. Apparently polystyrene's lack of resistance to needle abrasion is not due to lack of hardness since both in filled and unfilled polystyrene records, the visible evidence of wear is a dusty surface of polystyrene particles, whereas wear of records made from softer plastics is evidenced by fine thread-like cuttings.

The poor wear resistance of polystyrene records was then considered to be due to high coefficient of friction between the needle and the record groove surfaces. To lower the coefficient of friction, the incorporation of various waxes in the polystyrene was tried. It was found that most waxes were not compatible with polystyrene in amounts over 1 to 3 percent by weight of the polystyrene. Records made with compatible amounts of wax indicated however that satisfactory resistance to needle abrasion would probably be obtained if still larger amounts of wax could be incorporated in polystyrene. The problem thus presented, was how to incorporate the larger amount of wax without having it sweat out or migrate to the mold surface during the molding operation.

The answer to the problem came about from the discovery that intensive mixing of more than compatible amounts of wax with polystyrene at a temperature above that at which the resultant mixture was to be subsequently molded yielded a stable dispersion of the wax throughout the polystyrene mass which could be molded without the wax migrating or sweating out to the mold surface. Records which were compression or injection molded from dispersions thus made were found to be superior to shellac records as to fidelity of reproduction and lower noise level after repeated playbacks. While the amount of wax which can be satisfactorily incorporated in polystyrene by intensive mixing at above accepted molding temperatures without sweating out in the subsequent molding operation is nevertheless limited, being in general about 5 to 10 parts per 100 parts of polystyrene in excess of normal compatibility limits of 1 to 3 parts, this small excess is surprisingly effective in imparting good wearing properties in the molded records.

The waxes yielding the most beneficial results when incorporated in polystyrene record molding compositions in more than compatible amounts are the natural waxes, and particularly the ester type waxes, for example, carnauba, candelilla, montan, esparto, ouricury, beeswax, cotton wax, insect or Chinese wax, and the like; these waxes are principally mixtures of high molecular weight esters of higher monohydric alcohols and higher fatty acids, free acids and alcohols, and long chain aliphatic hydrocarbons. Another class of ester type waxes are essentially glycerol esters of higher fatty acids; waxes in this category include Japan wax, myrtle wax, and the synthetic waxes obtained by substantial hydrogenation of vegetable, marine and animal oils, such as soya bean oil, cotton seed oil, castor oil, whale oil, sardine oil, and mossbunker oil. Another class of natural waxes are the unsaponifiable hydrocarbon mineral waxes, such as paraffin waxes, microcrystalline waxes, ozokerite, and ceresin.

The normal compatibility of polystyrene and representative members of the aforedescribed classes of waxes was determined by dissolving various amounts of the wax under investigation in a 10% solution of a polystyrene in benzene. The polystyrene selected for the compatibility tests was representative of the polystyrenes found useful for production of phonograph records. It had an average molecular weight of about 65,000 and less than 3% percent of methanol soluble matter. From these solutions of wax and polystyrene, films were cast on glass surfaces, allowed to air dry overnight, and then oven dried at 100° C. for one-half hour. The dried films were then inspected for evidence of compatibility or incompatibility, a clear film being judged as compatible and a hazy or cloudy film as incompatible. Microcrystalline waxes (Be Square wax, and Crown Waxes 1035, 23, and 36) and carnauba wax at one percent by weight concentration in the polystyrene produced clear films but were incompatible at two percent and higher concentrations. Beeswax was compatible at up to three percent concentrations, but incompatible at four percent and higher. Paraffin wax (Essowax) was compatible at five percent, but incompatible at seven percent. Cardis Wax 319 was compatible at one percent concentration but not at two percent or higher.

Polystyrene molding compositions free from sweat-out, can be made by mixing together the polystyrene and a suitable wax in a Banbury mixer at temperatures at least above 160° C. and preferably between 175° C. and 225° C. until a uniform dispersion is secured; this is usually accomplished in about 10 to 20 minutes of intensive mixing. Heated rolls can also be used, but upwards of an hour or more of continuous mixing is necessary before the desired amount of wax is completely dispersed. It is also possible to add the required amount of wax to the styrene monomer and then to polymerize substantially all the monomer at temperatures from 100° to 140° C., followed by further heating with agitation at temperatures up to about 225° C. to complete the polymerization and to reduce the methanol soluble matter to less than 3.0 percent.

The polystyrenes most satisfactory for modification with wax for production of records are those having an average molecular weight between 50,000 and 80,000 or corresponding to a specific viscosity over concentration between 0.865 and 1.385 as calculated from viscosity determinations at 20° C. of a 0.100 percent by weight solution of the polymer in thiophene free benzene. Polystyrenes up to 150,000 average molecular weight can also be used, but tend to produce records more or less highly strained, particularly when injection molded. Polystyrenes of less than 40,000 average molecular weight are brittle and hence undesirable because the records molded therefrom have poor resistance to breakage. The methanol soluble matter in the polystyrene should not exceed three percent by weight and preferably is less than two percent, as such matter acts merely as an undesirable modifier for the composition. The polystyrene may be prepared by bulk, bead or emulsion polymerization suitably controlled to yield a polymer of the aforedescribed characteristics.

Fillers may be added to the wax modified polystyrene compositions to reduce warpage of records on storage at high room temperatures. The preferred fillers are barytes, diatomaceous silica, slate flour and calcium carbonate. The filler content may be varied through very wide limits—from 0 to about 75 percent for compositions which are compression molded. For injection molding, a filler content of a maximum of about 30 percent can be tolerated. The addition of 0.5 to 5.0 percent by weight of finely divided abrasive matter such as glass polishing grade silicon carbide or aluminum oxide is of advantage in phonograph records used on record players having sound pick up heads or arms applying more than 3 ounces of pressure on the needle and with needles poorly shaped with respect to the geometry of the sound grooves. The abrasive fillers slightly increase the noise level of the record, but are effective in abrading the needle rapidly to conform to the shape of the sound grooves.

Coloring matter such as carbon black and pigment can be added to the wax modified polystyrene compositions to impart a desired color. Dyestuffs which are soluble in polystyrene should be used only in small amounts (one to three percent), lest their use result in undesirable modification with consequent deterioration of sound and wear properties.

Metal soaps such as aluminum, iron, calcium, barium, manganese, sodium lead and zinc stearates, oleates and palmitates may be added in small amounts, from one to five percent by weight of the wax modified polystyrene. Of these, the zinc soaps are must effective in imparting favorable resistance to needle wear using either a sapphire needle or a long wearing alloy metal needle such as a Pfanstiehl needle.

Phonograph records of consistently good properties may be prepared by preforming the wax modified polystyrene compositions into preforms of the required weight, heating the preform on a table or in an oven to about 140° C., charging the heated preform into the mold or stamper when it is at a temperature of about 125° C., compressing the preform in the mold at a pressure between 2000 and 4000 pounds per square inch while raising the mold temperature to between 130° and 150° C. and then cooling the mold and its contents to about 60° to 80° C. before opening the press. The cooling to at least 80° C. before opening the press is essential to obtain flat records.

Sound and wear tests of the wax modified polystyrene records consisted of measuring noise level and frequency response changes produced by needle wear under various conditions of pick up arm weight and with different types of needles. Additionally the records were tested for resistance to breakage by dropping them in various positions onto a cement floor. Records containing up to 10 percent of wax on the weight of the polystyrene could be dropped from heights up to 10 feet without being damaged and thus were regarded as qualifying as records of the unbreakable type.

The following examples are given in illustration of the wear resistant records which can be made pursuant to the present invention. All parts are by weight.

*Example 1*

Polystyrene having a specific gravity of 1.05, a methanol soluble content of 2.0 per cent, and a specific viscosity over concentration of 1.26 (0.100% solution in thiophene free bezene) was mixed with the following amounts of carnauba wax:

a. 0.1%
b. 1.5%
c. 2.0%
d. 2.5%
e. 3.0%
f. 3.8%
g. 2.5% carnauba wax and 1 per cent zinc stearate.

The mixing was carried out by heating the mixtures to 200° C. in a Banbury and agitating for 15 minutes. The wax modified samples (a–g) as well as a blank sample of unmodified polystyrene were compression molded at 140° C. in a record press and cooled under pressure to 60° C. before discharge. All the records were of excellent clarity, and varied from water white in color to a very slight yellow tint with the higher wax modified compositions. The records were then played on an automatic record player. Periodically each record was removed from the player and rechecked for frequency response and noise level to determine the amount of deterioration of the sound characteristic produced by needle wear.

The unmodified polystyrene record after only a few playings with a chrome steel needle in a 2¾ ounce head had a definite increase in noise level and white dust appeared on the record surface. After 100 playings the noise level had increased to a value more than 20 decibels higher than the original value, and the frequency response in the range between 1000 and 10,000 cycles per second was less than the original value by an average of about 14 decibels.

(a) The record containing 0.1 per cent carnauba wax was so severely attenuated after 25 playings with a Pfanstiehl needle in a 2 ounce pickup arm as to be worthless and the record surface was covered by a layer of fine plastic particles cut from the record sound grooves by the needle.

(b) The record containing 1.5 per cent carnauba wax was played with a chrome needle in a 2¾ ounce pickup arm. After 25 playings it also dusted, and the noise level after repeated playings up to 100 times increased to an objectionable level. When playing with a lighter pickup arm of 1¼ ounces and a Pfanstiehl needle, attenuation was serious at all frequencies after 50 playings but the noise level did not increase as much as with the heavier head, although it too dusted.

(c) The record containing 2 per cent carnauba wax gave no dusting even after 500 playings with a Pfanstiehl needle in a 1¼ ounce pickup arm. After 200 playings attenuation was low at all frequencies and the noise level was commercially satisfactory. At 500 playings the attenuation was relatively low as compared with shellac records, but the noise level had increased to an objectionable value.

(d) The record containing 2.5 per cent carnauba wax had a good noise level and no significant attenuation after 500 playings with a Pfanstiehl needle in a 1¼ ounce pickup arm. Using the same type needle in a 2 ounce arm also resulted in a commercially satisfactory performance after 500 playings but with somewhat greater attenuation. When a record of the same composition was played with a sapphire needle in a 2 ounce pickup arm, the noise level was objectionable after 100 playings.

(e) The record with 3.0 per cent carnauba wax when playing under the same conditions as (d) exhibited substantially the same wear characteristics, but was slightly better in resistance to wear by the sapphire needle.

(f) Records containing 3.8 per cent of carnauba wax after 500 playings with either a sapphire needle or a Pfanstiehl needle were commercially satisfactory as regards noise level and attenuation.

(g) The record modified with a mixture of 2.5 per cent carnauba wax and 1.0 per cent zinc stearate had substantially the same wear resistance up to 500 playings as the records modified with 3.8 per cent of carnauba wax.

The effect of metal soaps other than zinc stearate was examined in polystyrene compositions prepared as in Example 1 (g) and in the same relative proportion of wax to soap. Zinc oleate yielded records of improved resistance to sapphire needles but slightly poorer resistance to wear by a Pfanstiehl needle. Lead stearate was almost as good as zinc stearate, but calcium stearate and iron stearate did not improve resistance to sapphire needles. Manganese stearate, sodium stearate and barium stearate yielded improved resistance to sapphire needles, but were poorer as regards Pfanstiehl needles.

*Example 2*

Polystyrene of the same characteristics as Example 1 was homogeneously admixed with candelilla wax at a temperature of 175° C. in these proportions by weight:

|  | a | b | c |
|---|---|---|---|
| Polystyrene | 99.0 | 97.5 | 100.0 |
| Candelilla wax | 1.0 | 2.5 | 3.0 |

The dispersed mixtures were sheeted on heated rolls and the sheets cut into preforms. Records were compressions molded from the preforms in the manner described in Example 1.

Records made with composition "a" were unsatisfactory with respect to noise level and attenuation after only 50 playings with a chrome steel needle in a 2¾ ounce pickup arm.

Records molded from composition "b" had a moderate increase in noise level after 100 playings and substantial retention of original frequency response when played with the same needle and pickup arm as "a."

Records of composition "c" however were commercially satisfactory after 500 playings but slightly inferior to records modified with 3 per cent of carnauba wax.

*Example 3*

Polystyrene as described in Example 1 was mixed with different amounts of beeswax (1 to 4 per cent) at 175°–200° C. in a Banbury mixer until the wax was completely dispersed.

|  | a | b | c | d |
|---|---|---|---|---|
| Polystyrene | 100 | 100 | 100 | 100 |
| Beeswax | 1 | 2 | 3 | 4 |

Records made from composition "a" were only slightly better than an unmodified polystyrene record.

Composition "b" produced records which when played with a Pfanstiehl needle in a 2 ounce pickup arm had a lower noise level after 500 playings than composition "a" after only 100 playings. Composition "b" records had a useful life of about 200 playings with a sapphire needle in a 2 ounce pickup arm.

Composition "c" was somewhat better than composition "b," but it was also limited to about 200 playings with a sapphire needle.

Composition "d" was commercially satisfactory as to noise level and frequency response after 500 playings with a Pfanstiehl needle in a 2 ounce pickup arm or after 400 playings with a sapphire needle.

*Example 4*

Polystyrene as in Example 1 was compounded with various amounts of microcrystalline wax (Crown Wax No. 23) on a two-roll mill heated to 160° C. After the wax was thoroughly dispersed in the polystyrene, the composition was sheeted and cut into preforms of a size adequate for molding 10-inch diameter sound records. The following compositions were prepared:

|  | a | b | c | d |
|---|---|---|---|---|
| Polystyrene | 99 | 100 | 100 | 100 |
| Microcrystalline Wax | 1 | 2 | 3 | 4 |

Transparent records were molded of composition "a," but they dusted and were unsatisfactory after 100 playings with a chrome steel needle in a 2¾ ounce pickup arm.

Records of composition "b" were opaque white in color. They were played with a Pfanstiehl needle in a 2 ounce head for 500 times without dusting and had a fair noise level and frequency response.

Opaque white records were molded of compositions "c" and "d." These were respectively superior to composition "b" after 500 playings.

Records of composition "d" exhibited good resistance to wear by a sapphire needle in a 2 ounce pickup arm for about 300 playings.

*Example 5*

A record composition containing fillers was prepared by mixing the following composition on a two-roll mill at 175° C. for 20 minutes.

| | Parts |
|---|---|
| Polystyrene (as of Example 1) | 85.0 |
| Carnauba wax | 2.13 |
| Zinc stearate | 0.85 |
| Baryte white | 15.0 |
| Carbon black | 0.5 |

The sheeted mixture was removed from the rolls, and compression molded at a temperature of 140° C. into record form. These records performed satisfactorily for up to 500 playings with either a Pfanstiehl needle or a sapphire needle in a 2 ounce pickup arm.

*Example 6*

A more highly filled record was prepared by mixing the following composition on a two-roll mill at about 170°–180° C. for 15 minutes.

| | Parts |
|---|---|
| Polystyrene (as in Example 1) | 50.0 |
| Carnauba wax | 1.25 |
| Zinc stearate | 0.50 |
| Slate flour | 50.0 |

Records were compression molded at a temperature of 140° C. from the above described composition. The records exhibited no dusting when played up to 500 times with a Pfanstiehl needle in a 2 ounce pickup arm. The frequency response gradually diminished after about 200 playings. Noise level while initially higher than records free of filler was remarkably constant throughout the 500 playings.

In other experiments, incorporation of larger amounts of waxes as herein described indicated good records could be made with up to about 11 per cent of wax on the weight of the polystyrene. However, above 8 per cent by weight, particularly in the instance of the ester type waxes such as carnauba, it was difficult to prepare uniform dispersions which would not exhibit a streaky appearance when molded. In general the ester type waxes yielded clear to translucent records when used within the aforementioned quantities. The straight hydrocarbon mineral waxes such as the microcrystalline waxes yielded opaque records. Paraffin waxes because of their lower melting points and higher compatibility tend to unduly plasticize and soften the polystyrene and thereby are less desirable than the lower compatibility and higher melting point microcrystalline waxes.

As a class the straight chain hydrocarbon mineral waxes are somewhat inferior to the ester type waxes in reducing wear by needle abrasion. But by mixing the hydrocarbon waxes with various amounts of a higher fatty acid such as stearic acid, palmitic acid, behenic acid, erucic acid, melissic acid, and the like and/or higher monohydric alcohol esters of such acids, for example, cetyl palmitate, the mixtures impart wear resistance properties similar to the natural ester waxes.

For example, 97 parts of polystyrene were admixed at 180° C. with 1.95 parts microcrystalline wax (Be Square), 0.75 part cetyl palmitate and 0.15 part behenic acid to yield a mixture which molded free of wax sweat-out. Records molded from this composition were comparable in resistance to wear by sapphire needles to records molded from polystyrene modified with 3 per cent of carnauba wax. They also exhibited good resistance to the wearing effects of Pfanstiehl needles.

Excellent wearing records are also obtained from polystyrene containing a dispersion of microcrystalline wax and an ester type wax. For example a dispersion mixture of 94 parts polystyrene, 3 parts carnauba wax and 3 parts microcrystalline wax, molded into records of the microgroove type had excellent wearing properties with both an osmium tipped microgroove needle and sapphire needles of correct design for microgroove records.

We claim:

1. Process for preparing a polystyrene molding composition suitable for phonograph record manufacture which comprises dispersing in a polystyrene of an average molecular weight between 40,000 and 150,000 as determined by viscosity measurements a more than normal compatible quantity of a natural wax and up to about 10 parts per 100 parts of polystyrene by the step of mixing the wax and the polystyrene together at a temperature between 160° and 225° C. until a uniform dispersion is obtained.

2. Process for preparing a polystyrene composition suitable for molding of phonograph records, which comprises mixing together at a temperature between 160° C. and 225° C. until a uniform dispersion is obtained, from 2 to 10 parts of a natural wax with 100 parts of a polystyrene having an average molecular weight between 50,000 and 80,000 as determined by viscosity measurements and less than 3.0% methanol soluble matter, said wax being normally incompatible with the polystyrene in amounts more than 1 per cent by weight.

3. A phonograph record composition comprising a dispersion of a polystyrene of an average molecular weight between 50,000 and 80,000 as determined by viscosity measurements and less than 3 percent of methanol soluble matter and between 2 and 10 parts by weight per 100 parts polystyrene of a natural wax, said composition being characterized by freedom from wax sweat-out when molded under heat and pressure.

4. A phonograph record composition comprising a dispersion mixture of a polystyrene of an average molecular weight between 50,000 and 80,000 as determined by viscosity measurements and less than 3 percent of methanol soluble matter and between 2 and 10 percent by weight on the polystyrene of a microcrystalline wax, said dispersion being characterized by freedom from wax sweat-out when molded under heat and pressure.

5. A phonograph record composition comprising a dispersion mixture of a polystyrene having an average molecular weight between 50,000 and 80,000 as determined by viscosity measurements and a methanol soluble content of less than 3 percent, and from 2 to 10 percent by weight on the polystyrene of a natural ester-type wax, said dispersion being characterized by freedom from wax sweat-out when molded under heat and pressure.

6. A phonograph record composition comprising a dispersion mixture of 100 parts by weight of a polystyrene having an average molecular weight between 50,000 and 80,000 as determined by viscosity measurements and a methanol soluble content of less than 3 percent, 1 part of a zinc soap and 2.5 parts of carnauba wax, said dispersion being characterized by freedom from wax sweat-out when molded under heat and pressure.

7. A record molded from the composition defined in claim 3.

8. A phonograph record composition suitable for injection molding comprising a homogeneous dispersion of a polystyrene having an average molecular weight between 50,000 and 80,000 as determined by viscosity measurements and less than 3 per cent of methanol soluble matter, a natural wax in amount between 2 and 10 parts by weight per 100 parts of polystyrene and up to 30 per cent by weight of the composition of finely divided mineral filler.

9. A phonograph record composition resistant to wearing by pickup arms applying needle pressure of more than 3 ounces comprising a homogeneous dispersion of a polystyrene having an average molecular weight between 50,000 and 80,000 as determined by viscosity measurements and less than 3 per cent of methanol soluble matter, a natural wax in amount between 2 and 10 parts by weight per 100 parts of polystyrene, and from 0.5 to 5.0 per cent of glass polishing grade finely divided abrasive.

10. A phonograph record composition comprising a homogeneous dispersion of (1) a polystyrene having an average molecular weight between 50,000 and 80,000 as determined by viscosity measurements and a methanol soluble content of less than 3%, (2) a natural ester-type wax, and (3) a microcrystalline wax, a total content of said waxes being between 2 and 10% by weight on the polystyrene, said homogeneous dispersion being characterized by freedom from wax sweat-out when molded under heat and pressure.

11. A phonograph record composition comprising a homogeneous dispersion of 94 parts polystyrene having an average molecular weight between 50,000 and 80,000 as determined by viscosity measurements and a methanol soluble content of less than 3%, 3 parts carnauba wax and 3 parts microcrystalline wax, said dispersion being characterized by freedom from wax sweat-out when molded under heat and pressure.

References Cited in the file of this patent

UNITED STATES PATENTS

| Number | Name | Date |
|---|---|---|
| 2,127,381 | Herrmann et al. | Aug. 16, 1938 |
| 2,224,852 | Lowry | Dec. 17, 1940 |
| 2,372,822 | Allen | Feb. 24, 1942 |
| 2,302,918 | Smith | Nov. 24, 1942 |
| 2,380,126 | Sturm | July 10, 1945 |
| 2,432,668 | Kingston | Dec. 16, 1947 |

FOREIGN PATENTS

| Number | Country | Date |
|---|---|---|
| 410,770 | Great Britain | May 14, 1934 |

OTHER REFERENCES

"Natural and Synthetic High Polymers," by Meyer, page 114, published by Interscience Publisher Inc., New York, New York.

"The Chemistry and Technology of Waxes," by Warth, published in 1947 by Reinhold Pub. Co., New York, New York.